Aug. 16, 1966   R. R. BURKE ETAL   3,266,470
ROTARY INTERNAL COMBUSTION ENGINE
Filed Sept. 13, 1963   3 Sheets-Sheet 1

INVENTOR.
RONALD R. BURKE
CHESTER J. SPRAGUE
STAN GIBSON

BY *T.R. Geisler*
ATTORNEY

Aug. 16, 1966  R. R. BURKE ETAL  3,266,470
ROTARY INTERNAL COMBUSTION ENGINE
Filed Sept. 13, 1963  3 Sheets-Sheet 2
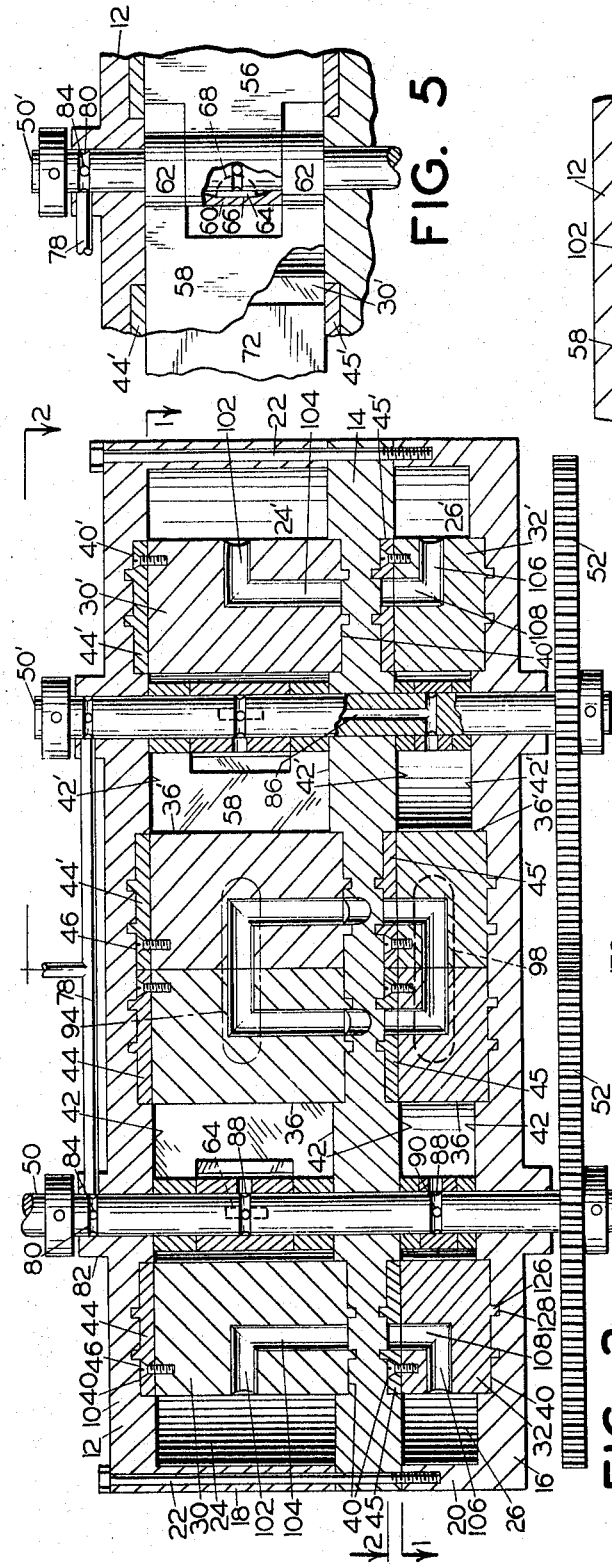
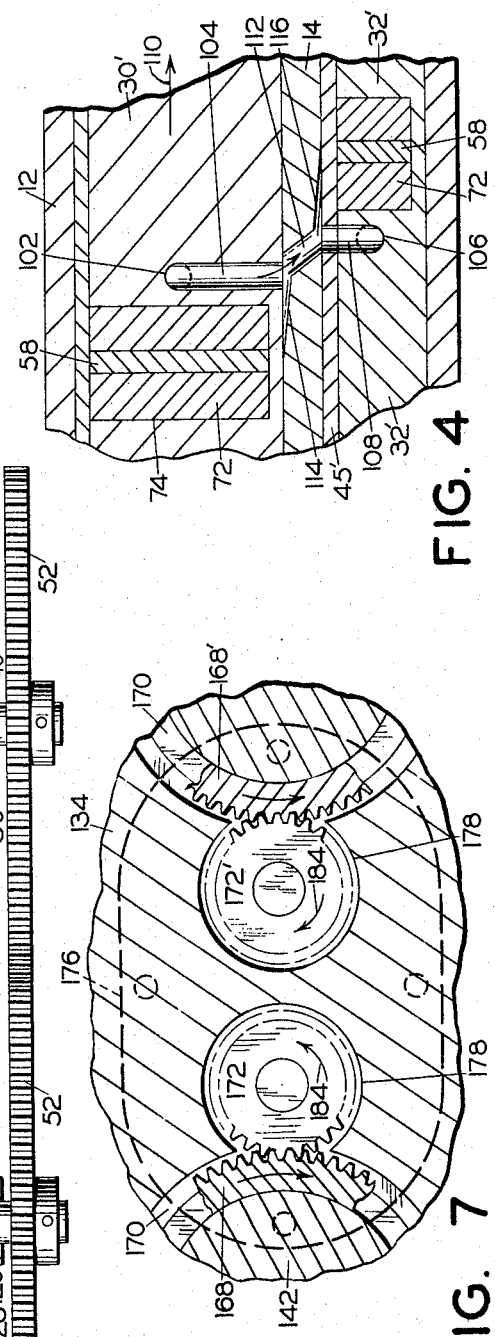
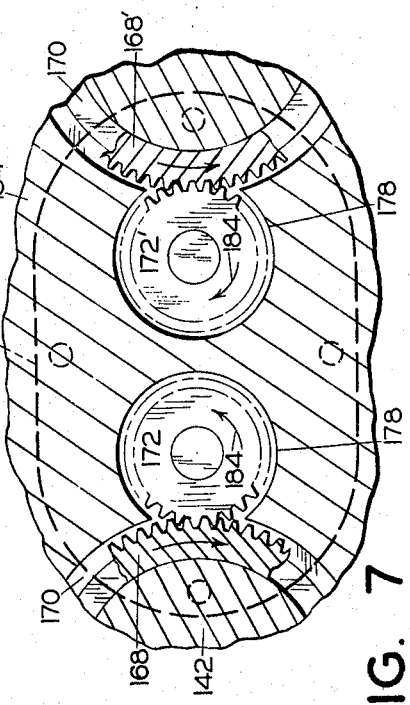
*INVENTOR.*
RONALD R. BURKE
CHESTER J. SPRAGUE
STAN GIBSON
BY *F. R. Geisler*
ATTORNEY Aug. 16, 1966   R. R. BURKE ETAL   3,266,470
ROTARY INTERNAL COMBUSTION ENGINE
Filed Sept. 13, 1963   3 Sheets-Sheet 3

INVENTOR.
RONALD R. BURKE
CHESTER J. SPRAGUE
STAN GIBSON

BY *T. R. Geisler*
ATTORNEY

United States Patent Office 3,266,470
Patented August 16, 1966

3,266,470
ROTARY INTERNAL COMBUSTION ENGINE
Ronald R. Burke and Chester J. Sprague, Portland, and Stan Gibson, Milwaukie, Oreg., assignors of one-fourth to Norman L. Easley, Portland, Oreg.
Filed Sept. 13, 1963, Ser. No. 308,798
4 Claims. (Cl. 123—16)

This invention relates to internal combustion engines and more particularly pertains to a rotary type internal combustion engine.

A primary objective of the present invention is to provide an internal combustion engine in which the impelled portion thereof operates efficiently in rotary motion to eliminate the loss of power inherent in the reciprocating type piston engines wherein the pistons must accelerate from stop limit positions in each stroke.

More specific objects of the present invention are to provide an engine of the type indicated employing a novel arrangement of induction and power rotors which operate in axially aligned pairs and are connected for unitary rotation, producing a compact and efficiently operating engine, with the pairs of induction and power rotors having edge rolling sealing engagement; to provide an improved engine of this type having a novel arrangement of compartments and induction and power rotors positioned eccentrically in the compartments to accomplish functions of fuel intake, compression, firing, and exhaust; to provide an improved engine with a novel vane structure cooperating with the induction and power rotors in fuel intake, compression, firing and exhaust; and to provide novel fuel transfer means arranged to transfer a compressed fuel mixture from induction rotors to power rotors for firing.

A further object is to provide a rotary internal combustion engine having novel sealing means for confining power forces therein.

A additional object is to provide a rotary internal combustion engine having a novel dual arrangement of rotor means accomplishing balanced operation of the engine, even heat distribution, and facilitating the use of a common fuel intake and a common exhaust outlet.

The manner in which these objects and other additional advantages are attained and the construction and manner of operation of the rotary engine of the present invention will be understood from the following description with reference to the accompanying drawings.

In the drawings:

FIG. 3 is a vertical sectional view taken on the line 3—3 of FIG. 2;

FIG. 4 is an enlarged, fragmentary sectional view taken on the arcuate line 4—4 of FIG. 2;

FIG. 5 is a fragmentary, sectional view taken on the line 5—5 of FIG. 1;

FIG. 7 is an enlarged, fragmentary, sectional view taken on the line 7—7 of FIG. 6.

Figure 1:
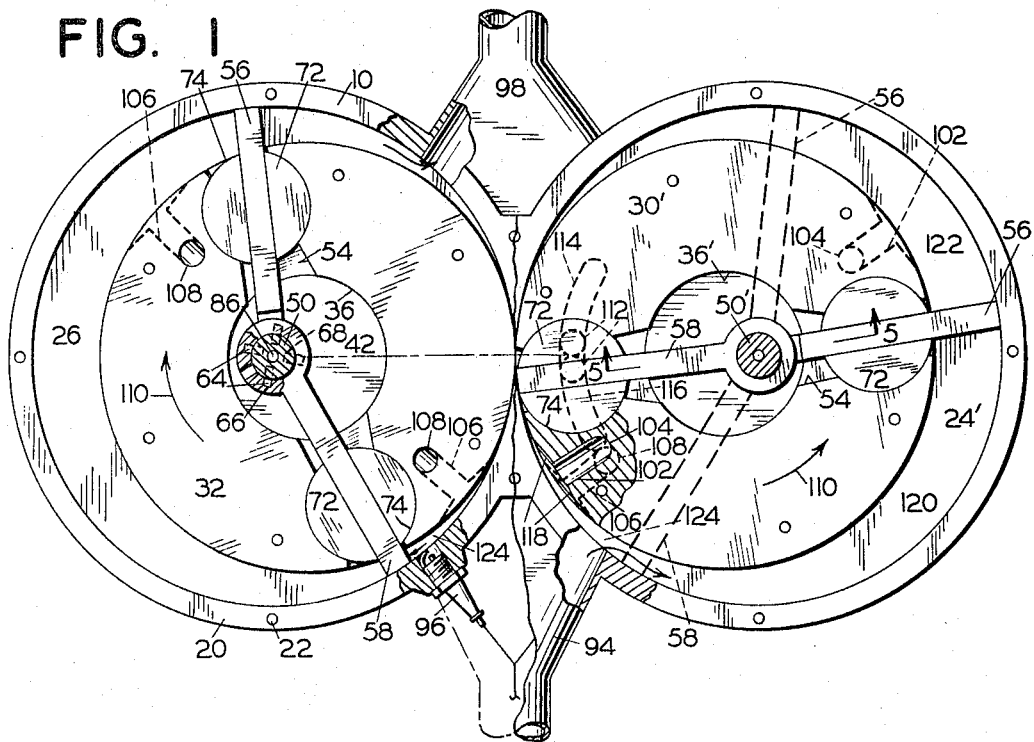
FIG. 1 is a staggered, horizontal, sectional view of one form of the invention, taken on the line 1—1 of FIG. 3 with parts thereof broken away.

In brief, the engine includes a housing having two adjoining cylindrical portions, with a horizontal partition extending through both portions dividing each portion into an upper and a lower circular chamber. In a preferred embodiment, a central shaft extends up through each housing portion and gears beneath the housing connect the shafts so that they rotate constantly in unison but in opposite directions. One of these shafts is extended up above the housing and serves as the driven power take-off shaft. An annular induction rotor is mounted in the upper chamber of each housing portion, these identical induction rotors being rotatably mounted in circular guide channels in the top and bottom walls of the respective upper chambers. However the guide channels are eccentrically positioned in the chambers so that the periphery of these two induction rotors have rolling contact with each other where the two cylindrical portions of the composite housing join. Each of these induction rotors has a pair of diametrically-opposite channels to accommodate a pair of vanes which extend from the center shaft to the cylindrical wall of the chamber. One of these vanes is keyed to the corresponding center shaft and the other vane is hinged on the shaft. These vanes define compartments between the cylindrical wall of the chamber and the periphery of the eccentric induction rotor within the chamber, which compartments are ordinarily increased and decreased with the rotation of the vanes and rotors, the action being similar to a well-known type of rotary compression pump. The purpose of these two induction rotor assemblies is to draw in fuel from the carburetor of the engine and to deliver the fuel under pressure into the lower chambers where the combustion of the compressed fuel takes place.

In the lower chamber of each of the two cylindrical housing portions is a power rotor having the same inner and outer diameters as the induction rotor in the above chamber and similarly eccentrically mounted in guideways in the upper and lower walls of the lower chamber, the lower rotor being in exact registration with the corresponding upper rotor. Thus the two lower power rotors in the two adjoining cylindrical housing portions also have rolling peripheral contact with each other. Each of these lower power rotors also has a pair of diametrically-opposite channels to accommodate a similar pair of vanes, one of which is keyed to the center shaft and the other of which is hinged on the center shaft. Compressed fuel from the upper chamber is delivered into a firing compartment in the lower chamber and fired by a spark plug, and the resulting explosion force causes the operation of the engine, the spent gases finally being exhausted through an exhaust port as the individual fired compartment is again decreased in size.

In another embodiment, gear means are employed to interconnect the upper and lower rotors together in sets for rotation in unison as well as to interconnect the sets together in order that the whole assembly will rotate together. In this embodiment the output shaft leads from the gear means rather than from shaft means which interconnect upper and lower rotors together in a set.

Referring first to FIGS. 1–5, the engine has a housing 10 with a horizontal top wall 12 (FIG. 3), a horizontal intermediate wall or partition 14, and a horizontal bottom wall 16. The top and bottom walls 12 and 16 have peripheral, inturned flanges 18 an 20, respectively, suitably engaged by studs 22 for securing the parts in assembled relation.

The plan configuration of the housing is shown in

Figure 2:
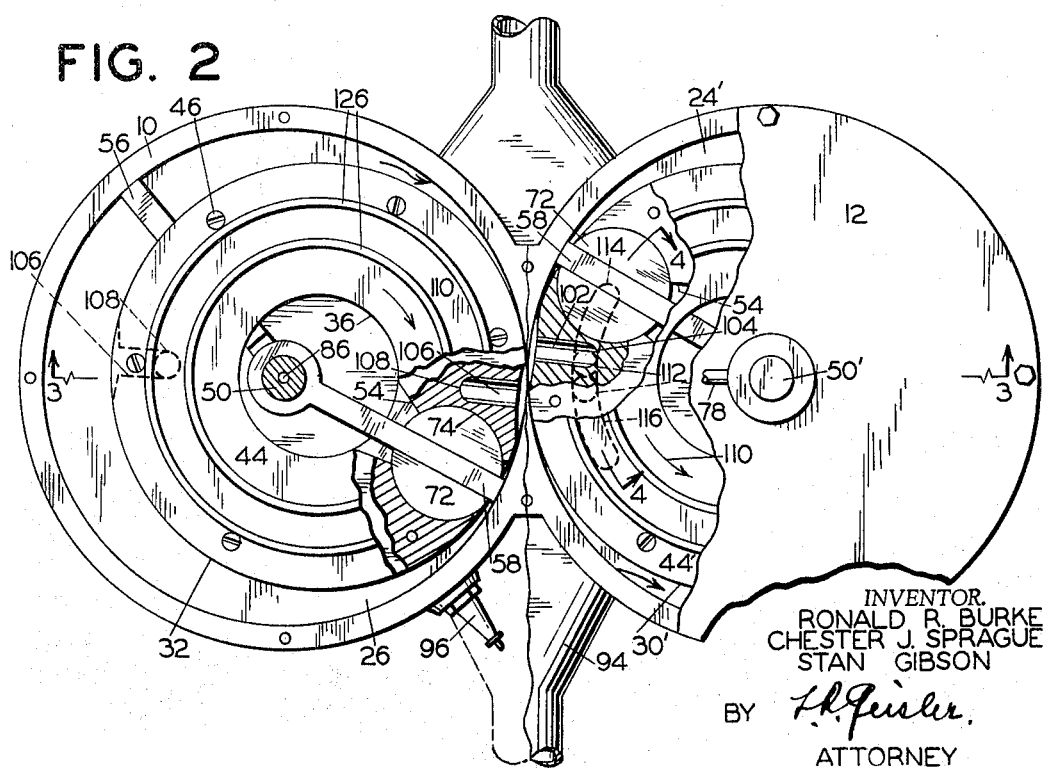
FIG. 2 is a staggered, horizontal, sectional view taken on the line 2—2 of FIG. 3, also with parts broken away.

FIGS. 1 and 2. The housing includes a pair of circular upper compartments 24 and 24' (FIG. 3) and a pair of circular lower compartments 26 and 26'. The compartments 24 and 24' open into each other as do compartments 26 and 26'. It is to be noted however, that even though these respective pairs of horizontally aligned compartments communicate, there is no cooperating function therebetween in the operating functions of the engine since as will be apparent hereinafter, compartments 24 and 26 cooperate together to produce the drive function, as do compartments 24' and 26'.

Rotably operable in the upper compartments 24 and 24' are induction rotors 30 and 30', respectively, and rotatably operable in the lower compartments 26 and 26' are power rotors 32 and 32' respectively. Rotors 30 and 32 have a central bore 36 and rotors 30' and 32' have a similar bore 36'. Each of the walls 12, 14, and 16 is provided with annular recesses 40 and 40' (FIG. 3), on their surfaces which are directed toward the compartments 24, 26 or 24', 26' respectively. These annular recesses form hubs 42 and 42' on which the rotors are journaled. The upper ends of the rotors 30 and 30' have top plates 44 and 44' respectively, and the upper ends of rotors 32 and 32' have top plates 45 and 45', all of such plates being removably secured to their rotors by screws 46. As best seen in FIG. 3, these top plates project into respective ones of the recesses 40 and 40' and the recesses 40, 40' form circular guide channels for the rotation of the rotors.

It will be apparent from FIGS. 1 and 2 that the diameter of the rotors is less than the diameter of the compartments in which they are contained and furthermore the journal hubs 42 and 42' therefor are eccentrically positioned in the compartments to offset the rotors from the center of the compartments. Furthermore, the parts are dimensioned and arranged so that the peripheries of the two induction rotors and the peripheries of the two power rotors have respective rolling contact with each other in the center of the housing, such rolling contact serving to seal off the areas on opposite sides of the rotors. The relative eccentric or offset arrangement of the rotors in their respective compartments is important in the operation as will be more apparent hereinafter.

A shaft 50 extends through the bores 36 of rotors 30 and 32 and a shaft 50' similarly extends through the bores 36' of rotors 30' and 32'. These shafts are concentric with the rotor containing compartments, as best seen in FIGS. 1 and 2, and since the rotors are offset from the center of their compartments the shafts in turn are offset from the centers or bores of the rotors. The shafts 50, 50' project from the lower end of the housing and have gears 52 keyed thereto (FIG. 3). These gears are in meshing relation and establish a unitary rotation of the shafts but in opposite directions. The ends of the shafts opposite from the gears 52 also project from the housing with one of such shafts, such as shaft 50, extending further and serving as the driven power take-off shaft.

Each of the four rotors has a diametrical slot 54, FIGS. 1 and 2, in which is disposed a pair of vanes 56 and 58 mounted on the shaft 50 or 50'. The mounted connection of the vanes 56 and 58 on the shafts is accomplished by a hinge-type structure, with the vane 56, FIG. 5, having a looped end 60 encircling the shaft and the vane 58 having a pair of looped ends 62 encircling the shaft on each side of loop 60. The looped ends 62 of the vanes 58 freely encircle the shafts for rotation relative thereto, but the looped ends 60 of vanes 56 are keyed to the shafts by means of keys 64 engaging keyways 66 and 68 in the vane 56 and shaft respectively. As seen in FIG. 1, a plurality of the keyways 68 are provided around the shafts whereby the vanes 56 may be selectively positioned for proper timing and selective compression ratio of the engine.

Vanes 56 and 58 are slidably mounted in split bushings 72, FIGS. 1 and 2, contained in suitable recesses 74 adjacent the outer end of the slots 54 in the rotors. The vanes are of a predetermined length such that the end edges therof are arranged to sweep around the inner surfaces of the campartments, and since one of the vanes in each of the vane assemblies is pivotal relative to the shaft and both vanes of each assembly are slidable in bushings 72, and further since the bushings 72 are rotatable in their recesses 74, the end edge of the vanes sweep around the inner surfaces of the compartments even though the rotors are eccentrically positioned in their respective compartments. The vanes define various chambers between the inner surfaces of the compartments and the peripheries of the rotors, which chambers are increased and decreased as the rotors rotate and accomplish in this way their various functions of fuel intake, compression, firing, and exhaust, as will be more apparent hereinafter.

Means are provided for lubricating the shafts and vanes. For this purpose, there is employed an oil line 78, FIG. 3, which leads from a suitable pressured source and which communicates with peripheral grooves 80 in the shafts, such grooved portions of the shafts being disposed inwardly of the ends of projecting bosses 82 on the housing. Communicating with the peripheral grooves 80 are a plurality of radial bores 84 leading to central longitudinal passageways 86, FIGS. 1 and 2, in the shafts. The shafts are provided with peripheral grooves 88 and radial outlet bores 90 internally of the engine through which lubricating oil is fed from passageways 86 to lubricate the hinge mechanism and the sliding engaging surfaces between the vanes and the bushings 72.

Leading centrally into the housing 10 and communicating with both the induction compartments 24 and 24' is a fuel intake manifold 94 to which a suitable air fuel mixture may be fed as by conventional carburetion mechanism, not shown. Mounted in the housing 10 are spark emitting means such as spark plugs 96. The hot ends of these spark plugs open into the lower compartments 26, 26' respectively and provide the spark, together with other electrical and timing means such as magneto or distributor means, not shown, to fire a compressed fuel mixture. FIGS. 1 and 2 show one of the spark plugs 96, the other one, namely, the one associated with the compartment 26' and power rotor 32', being hidden by the manifold 94. The left portion of this manifold, however, is indicated by broken lines to illustrate the overall contour thereof.

Leading into the housing at the side opposite from the fuel intake manifold and communicating with the power compartments 26 and 26' is an exhaust manifold 98. The relative vertical positioning of the fuel intake manifold 94 and the exhaust manifold 98 is shown in phantom and broken lines respectively, in FIG. 3.

As pointed out hereinbefore the induction rotor 30 works with power rotor 32 in producing the various cycles of engine operation and the same is true of induction rotor 30' and power rotor 32', but there is no coaction between the two induction rotors and between the two power rotors except for the edge rolling contact to perform a sealing function to isolate one side of the engine from the other. In fact, as will be seen, each set of induction and power rotors comprises a complete engine operating independently of the other.

As the vanes 56, 58 of the induction rotors sweep past the fuel intake manifold area, they draw in a fuel mixture from such manifold. It is then desired to compress the fuel mixture and transfer it to the power rotor. To accomplish such transfer each of the induction rotors 30, 30' has a pair of horizontally disposed radial bores 102 leading inwardly from the outer peripheral surface thereof (FIG. 3). Leading downwardly from bores 102 at right angles thereto are bores 104 opening through the bottom surface of the rotors. In somewhat a similar contruction the power rotors 32, 32' have a pair of horizontally disposed radial bores 106 leading inwardly from the outer peripheral surfaces of the said rotors and a vertical bore 108 leading upwardly at right angles from the bores 106 and opening through the top of the power rotors. Bores 104 and 108 have an identical radial spacing in their respective rotors.

The intermediate wall 14 has a pair of transfer ports 112 therethrough, one of such ports being provided for each assembly of induction and power rotors. As best seen in FIG. 4, ports 112 are disposed in the rotating path of the bores 104 and 108 whereby communication between bores 104 and 108 is established only when in registry with such port. Ports 112 are inclined in the direction of travel of the rotors, such direction of travel being indicated by arrows 110 in FIGS. 1, 2, and 4, and have an upper, inclined, lead-in grooves 114 and a lower, inclined lead-out groove 116, these grooves extending in opposite directions from each other and inclined such that their depth decreases as they progress away from the port 112. As seen in FIGS. 1 and 2, grooves 114 and 116 are arcuate to assume the circular path of bores 104 and 108. Since the induction rotors and their respective power rotors have unitary rotation with their shafts the bores 104 and 108 travel in the same position at all times, and, as best apparent in FIG. 4, the bore 108 leads the bore 104 a slight amount for the transfer of the fuel mixture. Thus, as bore 104 moves into registry with groove 114 a gradual transfer of a fuel mixture commences into port 112. Upon further movement of the bore 104 a wide open transfer is accomplished until it passes port 112 whereupon a quick shut-off occurs. Bore 108 has a quick opening with port 112 but gradually closes as it progresses along groove 116.

The edge surfaces of the rotor have short, peripherally extending grooves 118, FIG. 1, on each side of the outlets of bores 102 and 106. These grooves serve to prevent formation of a vacuum as said bores move past the center point of rolling engagement of the rotors.

As noted in FIG. 3, the induction rotors are of greater thickness than the power rotors. Such greater thickness of the induction rotors increases the volume of fuel mixtures which may be drawn in and fed to the power rotors. The relative thickness of the rotors may vary depending upon the volume of fuel mixture to be transferred. Selective positioning of keyway 68 can be accomplished to vary the compression ratio as desired.

The assembly joints, such as between the housing parts 12, 14, and 16, have suitable gaskets, not shown, for sealing in compression and power forces. The flat upper and lower surfaces of the rotors, however, are sealed from the compartments by sealing means in the form of annular ribs 126 and grooves 128. As seen in FIG. 3, the grooves 128 are formed in the housing parts and the ribs 126 are formed directly on the rotors, on the top plates of the rotors, but of course a reversal of such ribs and grooves would perform a sealing function as well. A close tolerance is necessary between the ribs and grooves to accomplish the sealing necessary, and it is preferred that at least two of them be provided in the joints to be sealed. Vanes 56 and 58 are machined for close tolerance with the split bushings 72 to prevent inward travel of a fuel mixture or of power forces and the bushings 72 are also closely fitted with their recesses 74 for sealing purpose.

In the operation of the device it is clear that the complete assembly of rotors have unitary rotation since they are all interconnected by means of the shafts 50, 50'. The rotors 30, 32, however, rotate in a direction opposite from that of rotors 30' and 32'. The vanes 56 and 58 of induction rotor 30 are symmetrically located with relation to the vanes 56 and 58 of the induction rotor 30', and similarly the vanes of the power rotors are symmetrically located. Furthermore, the passageways 102, 104 of the induction rotor 30 are symmetrically located with relation to the passageways 102, 104 of the induction rotor 30' and the same is true of the passageways 106, 108 in the power rotors.

Regarding the operation of the engine only the function of one side the engine need be described since both sides operate in the same manner. For this purpose, the operation of the right side will be described, as viewed in FIGS. 1 and 2, although some functions will be illustrated by reference to the other side.

The vanes 56 and 58 of the induction rotor 30' draw in a fuel mixture from the manifold 94 as they sweep thereby. More particularly, the trailing sides of these vanes draw in the fuel mixture each time they sweep past the manifold 94. The leading side of the following vane then serves to compress such mixture. To illustrate, the area of compartment 24' on the trailing side of vane 56, and designated by the reference numeral 120 in FIG. 1, contains the mixture which has been drawn in by the vane 56. The area on the leading side of this vane in this view, and designated by the numeral 122, contains the mixture drawn in by the prior sweep of vane 58 and is being compressed by the vane 56 as the area 122 decreases in size.

As vane 56 advances, it further compresses the fuel mixture until such time that bore 104, located just ahead of the vane 56, comes into registry with tapered groove 114 of the bore 112. Thereupon, the compressed fuel mixture, commences transfer through the groove 114 and port 112 into the bore 108 and out bore 106 into the compartment 26'. The induction rotor 30', in FIG. 2, is shown in a position wherein a fuel mixture is being transferred through the groove 114 and port 112. At the time that bore 104 has moved past port 112 and therefore the transfer of the fuel mixture cut off, one of the vanes of the power rotor will have advanced beyond the spark emitting means and have formed a combustion chamber 124 (shown on the left side in FIG. 1) into which the compressed fuel mixture has been transferred, the relative positioning of the vanes and bores 108 in the power rotors being preselected whereby such fuel mixture is admitted only after a vane forms such a combustion chamber. As seen in FIG. 1, this relative positioning comprises a trailing position of bore 108 with regard to vane 58. The position of the vane 58 at firing is illustrated in dotted lines on the right side of the engine and in full lines on the left side.

At this point a spark is emitted and the forces of combustion act on the trailing side of the vane 58 to impel the power rotor. At the same time the leading side of this vane expels exhaust from the previous combustion out through exhaust manifold 98. Thus, in the operation of the engine, each induction rotor vane in one complete revolution thereof serves to draw in a fuel mixture, compress the mixture drawn in by the preceding vane, and transfer it to the lower power compartment, and each power rotor vane serves to form a combustion chamber and to expel exhaust. In view of the symmetrical arrangement of the two engine sides, the functions of fuel intake, compression firing, and exhaust occur simultaneously on both sides. Although a symmetrical arrangement of the parts is not necessary, it has been found that it provides a balanced operation of the engine.

Although the housing 10 has been illustrated and described as being in horizontal position, the housing could be positioned vertically or in fact arranged in any other position.

Figure 8:
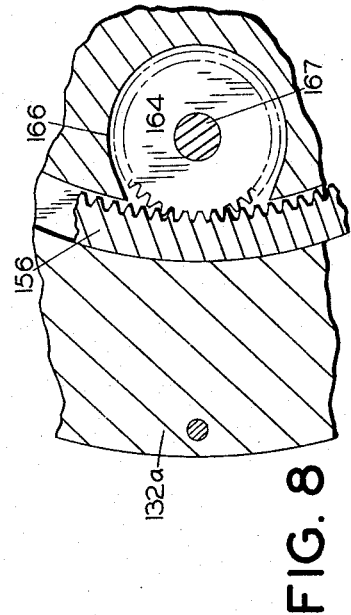
FIG. 8 is an enlarged, fragmentary, sectional view taken on the line 8—8 of FIG. 6.
Figure 6:
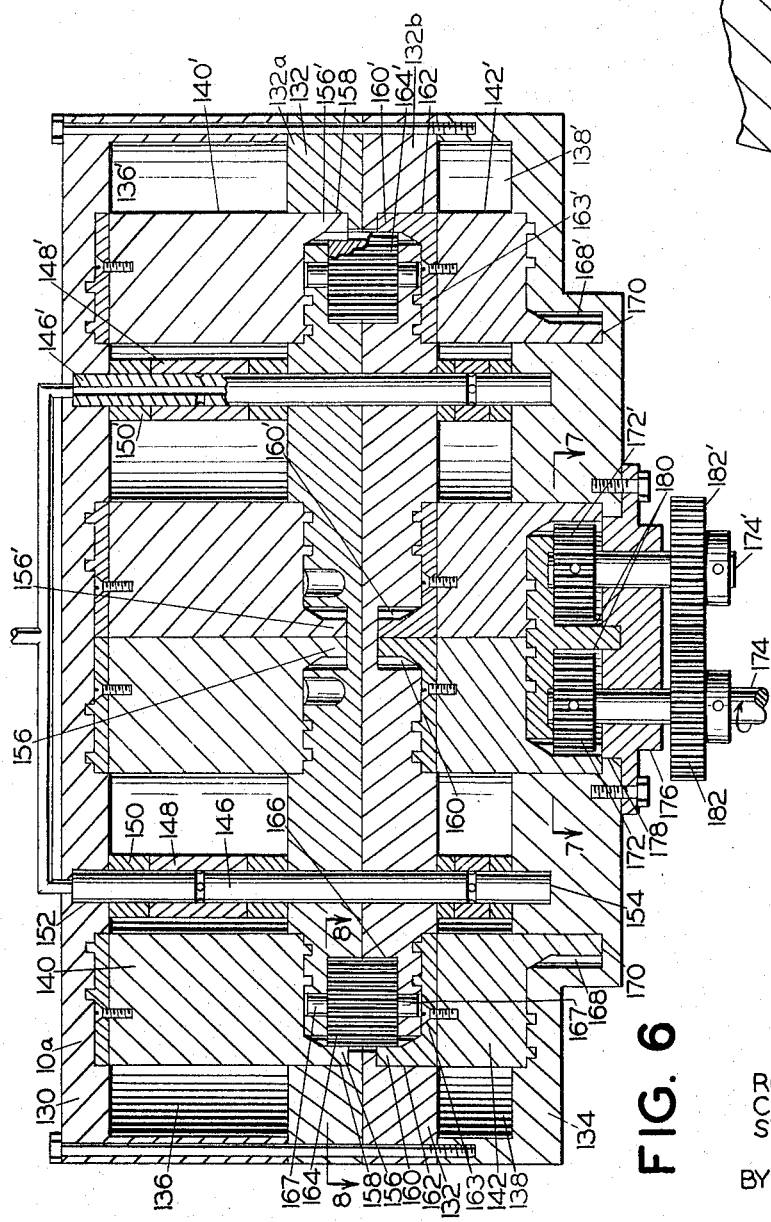
FIG. 6 is a vertical, sectional view similar to FIG. 3 but showing a modified form of the invention.

A modification of the invention is shown in FIGS. 6, 7, and 8. In the FIG. 1 embodiment, unitary rotation of cooperating sets of induction rotors 30, 32, and 30', 32' is accomplished by shafts 50, 50', respectively, since the vanes 58 are keyed thereto to lock the sets of rotors together in their rotation, and unitary rotation of the entire assembly is accomplished by the end gears 52. The modification of FIGS. 6-8 illustrates how unitary rotation of the sets of cooperating rotors and the entire assembly may be achieved by other means.

Referring first to FIG. 6, a housing 10a has a top wall 130, an intermediate wall or partition 132 formed of a pair of face abutting plates 132a and 132b, and a bottom wall 134. Upper circular compartments 136 and 136' and lower circular compartments 138 and 138' are formed in the housing as in FIG. 1, and similarly mounted therein are induction rotors 140 and 140' and power rotors 142 and 142', respectively. The eccentric operation of the rotors in their various compartments and the cooperation of the axially aligned sets of rotors is the same as the structure of FIG. 1.

In the FIG. 6 embodiment, shafts 146 and 146' are employed which are not connected to a driven output shaft of the engine but merely comprise vane mounting shafts for sets of vanes 148 and 150 and 148' and 150' respectively. Both vanes in the sets thereof are pivotally mounted on the shaft and thus have no interconnecting function for unitary rotation of induction rotors and power rotors. Shafts 146 and 146' are seated at their ends in sockets 152 and 154 in the top and bottom plates of the housing.

The interconnecting function between the sets of induction rotors 140, 140' and their respective power rotors 142, 142' is accomplished by gear means. More particularly, induction rotors 140 and 140' have downwardly depending ring gear extensions 156 and 156', respectively, projecting into suitably contoured, annular grooves 158 in the upper surface of intermediate wall 132. Similarly, power rotors 142 and 142' have upwardly projecting ring gear extensions 160 and 160', respectively, projecting into suitably contoured grooves 162 in the under surface of intermediate wall 132, such extensions being on removable top plates 163 and 163' respectively of rotors 142 and 142'. The ring gears 156, 162 and 156', 162' have engagement respectively with gears 164 and 164' disposed in sockets 166 in the intermediate wall. These gears are rotatably mounted in their sockets by end stub shafts 167 having journaled engagement in the wall 132. By means of the gear connection between the sets of induction and power rotors, such sets of rotors will have unitary rotation.

It is also desirable that the two sets of rotors be tied together for unitary rotation but in opposite directions. For this purpose, power gears 142 and 142' have downwardly depending ring gear extensions 168 and 168' respectively, operating in annular grooves 170 in bottom plate 134. Gears 168 and 168' mesh with gears 172 and 172' respectively, and these latter gears are keyed to respective shafts 174 and 174' journaled in an insert 176 bolted to the under surface of plate 134. Bottom plate 134 is suitably recessed at 178 to receive the insert 176 and is further suitably recessed at 180 to receive the gears 172, 172'.

Shafts 174 and 174' project exteriorly from the insert and have a second set of gears 182, 182' keyed to the projecting ends thereof. These latter gears are in meshing relation whereby the whole assembly of rotors has unitary rotation. It is clear from the gear arrangement described that an induction rotor and a power rotor in a set rotate in the same direction but in view of the meshing gears 174, 174' the two sets of rotors rotate in opposite directions, as designated by the arrows 184 in FIG. 7. Shaft 174 is extended to serve as the driven output shaft of the engine.

The present invention provides a rotary internal combustion engine which operates with great efficiency and is compact in size. This engine also has the improved arrangement wherein a common fuel intake and a common exhaust outlet are utilized for a pair of engine portions. The symmetrical arrangement of the engine portions accomplishes a balance structure free of vibration.

An engine embodying the principle of the invention may, if desired, be constructed of a single induction rotor, cooperating with a single power rotor, in which case it would be required that said rotors at their inner rolling edge be sealed against the housing wall. On the other hand, the engine may comprise two or more of the assemblies shown in FIGS. 1 or 6, it being necessary only that suitable connection of all assemblies be made to a common shaft 50 or 174.

It is to be understood that the forms of our invention herein shown and described are to be taken as preferred examples of the same and that various other changes in the shape, size and arrangement of parts may be resorted to without departing from the spirit of our invention or the scope of the claims.

We claim:

1. A dual unit rotary internal combustion engine comprising a housing having parallel end walls and an enclosing peripheral side wall, a partition in said housing disposed in parallel relation to said end walls, one of said end walls together with said partition and said peripheral side wall defining a first pair of circular compartments in side by side relation, the other of said end walls together with said partition and said peripheral wall defining a second pair of circular compartments in axial alignment with respective ones of said first compartments, a shaft projecting axially through each axially aligned pair of compartments, an induction rotor mounted eccentrically in each of said first compartments, vane means mounted on said shafts and projecting through said induction rotors for edge engagement with the defining walls of their respective compartments to form fuel intake and compression chambers, a power rotor mounted eccentrically in each of said second compartments in axial alignment with the induction rotors in said first compartments, respectively, vane means in said power rotors having edge engagement with the defining walls in said second compartments to form firing and exhaust chambers, means connecting the respective axially aligned pairs of induction and power rotors together for unitary rotation, and fuel transfer means extending between said first and second compartments and operative with the rotors to transfer compressed fuel from each of said first compartments to the corresponding second compartment, the induction rotors being in edge rolling sealing engagement with each other through their entire periphery and the power rotors also being in edge rolling sealing engagement with each other through their entire periphery, said edge rolling rotors separating the housing into a dual operating unit with one pair of axially aligned induction and power rotors operating independently of the other pair of axially aligned induction and power rotors in fuel intake, compression, firing and exhaust functions.

2. The rotary internal combustion engine of claim 1 wherein said means connecting the respective axially aligned pairs of induction and power rotors for unitary rotation includes an adjustable connection operative to adjust rotatably one of said induction and power rotors in the axially aligned pairs of rotors relative to the other.

3. The rotary internal combustion engine of claim 1 wherein said means connecting the respective axially aligned pairs of induction and power rotors for unitary rotation includes gear teeth on said rotors, and gear means meshing with the gear teeth on the respective pairs of induction and power rotors, said gear and gear teeth connection providing adjustment in rotating position between the induction rotors and their respective power rotors.

4. The rotary internal combustion engine of claim 1 wherein the vane means for each of the induction and power rotors comprises a pair of vanes, a shaft projecting axially through each pair of axially aligned compartments, gear means connecting the shafts together, one of said vanes for each of said induction rotors being pivotally mounted on its shaft, and multiple keyways and key means in each shaft for the other vane for the induction rotor arranged for rotatably adjusting said induction rotors on said shafts.

(References on following page)

References Cited by the Examiner

UNITED STATES PATENTS

| | | | |
|---|---|---|---|
| 1,242,826 | 10/1917 | Llewellyn | 123—8 |
| 1,616,285 | 2/1927 | Stern | 103—144 |
| 1,748,568 | 2/1930 | Grover | 123—16 |
| 1,780,443 | 11/1930 | Schumann | 123—8 |
| 1,792,026 | 2/1931 | Nichols | 123—8 |
| 1,949,225 | 2/1934 | Lammeren | 123—8 |
| 2,037,450 | 4/1936 | Bancroft | 123—16 |
| 2,058,817 | 10/1936 | Northey | 123—8 |
| 2,158,532 | 5/1939 | Bullen | 123—8 |
| 2,273,754 | 2/1942 | Hand | 123—8 |
| 2,511,441 | 6/1950 | Loubiere | 123—8 |
| 3,139,722 | 7/1964 | Yokoi | 123—8 |
| 3,152,582 | 10/1964 | Larcher | 123—8 |

MARK NEWMAN, *Primary Examiner.*

KARL J. ALBRECHT, DONLEY J. STOCKING,
*Examiners.*

R. M. VARGO, *Assistant Examiner.*